(12) United States Patent
Kasperchik et al.

(10) Patent No.: US 9,133,358 B2
(45) Date of Patent: Sep. 15, 2015

(54) INKJET INK

(75) Inventors: Vladek Kasperchik, Corvallis, OR (US); Cory J. Ruud, Corvallis, OR (US); Vladimir Jakubek, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/375,401

(22) PCT Filed: Apr. 24, 2012

(86) PCT No.: PCT/US2012/034764
§ 371 (c)(1),
(2), (4) Date: Jul. 29, 2014

(87) PCT Pub. No.: WO2013/162513
PCT Pub. Date: Oct. 31, 2013

(65) Prior Publication Data
US 2014/0352573 A1    Dec. 4, 2014

(51) Int. Cl.
| C09D 11/02 | (2014.01) |
| C09D 11/38 | (2014.01) |
| C09D 11/322 | (2014.01) |
| C09D 11/326 | (2014.01) |
| C09C 1/36 | (2006.01) |

(52) U.S. Cl.
CPC .............. *C09D 11/38* (2013.01); *C09C 1/3669* (2013.01); *C09D 11/322* (2013.01); *C09D 11/326* (2013.01)

(58) Field of Classification Search
CPC ...... C09D 11/30; C09D 11/322; C09D 11/38; C09D 11/326

USPC .............................................. 106/31.6, 31.86
See application file for complete search history.

(56) References Cited

U.S. PATENT DOCUMENTS

| 4,113,691 | A | 9/1978 | Ward |
| 4,880,465 | A | 11/1989 | Loria et al. |
| 6,180,690 | B1 | 1/2001 | Spinelli |
| 6,277,183 | B1 | 8/2001 | Johnson et al. |
| 6,821,586 | B2 | 11/2004 | Teegarden et al. |
| 7,052,536 | B2 | 5/2006 | Yatake |
| 7,264,662 | B2 | 9/2007 | Dodge et al. |
| 7,449,502 | B2 | 11/2008 | Vasudevan |
| 7,592,378 | B2 | 9/2009 | Lin et al. |
| 7,635,504 | B2 | 12/2009 | Elwakil et al. |
| 8,784,550 | B2 * | 7/2014 | Kasperchik ................ 106/31.65 |
| 8,821,627 | B2 * | 9/2014 | Kunii ............................ 106/426 |

(Continued)

FOREIGN PATENT DOCUMENTS

| CN | 101094888 | 12/2007 |
| CN | 101166795 | 4/2008 |

(Continued)

*Primary Examiner* — Veronica F Faison
(74) *Attorney, Agent, or Firm* — Dierker & Associates

(57) ABSTRACT

An inkjet ink includes a pigment incorporated in an aqueous ink vehicle. The pigment includes metal oxide and/or mixed metal oxide particles and a plurality of reacted dispersant molecules attached to the outer surfaces of the particles to form a coating on the outer surfaces. The reacted dispersant molecules are attached to the metal oxide and/or mixed metal oxide particle outer surfaces through a silanol linking group of the reacted dispersant molecules. The coating is present in an amount ranging from about 10 wt % to about 50 wt % with respect to the wt % of the metal oxide and/or mixed metal oxide particles.

15 Claims, 2 Drawing Sheets

(56) References Cited

U.S. PATENT DOCUMENTS

| | | |
|---|---|---|
| 2005/0197419 A1 | 9/2005 | Graziano et al. |
| 2007/0078200 A1 | 4/2007 | Yoshida et al. |
| 2007/0101898 A1 | 5/2007 | Akiyama et al. |
| 2008/0250971 A1 | 10/2008 | Ganapathiappan et al. |
| 2009/0092801 A1 | 4/2009 | Sato et al. |
| 2010/0003407 A1 | 1/2010 | Ito |
| 2010/0039463 A1 | 2/2010 | Van Thillo et al. |
| 2010/0048809 A1 | 2/2010 | Nolte et al. |
| 2010/0242789 A1 | 9/2010 | Sano et al. |
| 2010/0302300 A1 | 12/2010 | Verdonck |
| 2011/0039115 A1 | 2/2011 | Domes et al. |
| 2013/0065031 A1* | 3/2013 | Kasperchik et al. .......... 428/207 |

FOREIGN PATENT DOCUMENTS

| | | |
|---|---|---|
| EP | 1184426 | 3/2002 |
| EP | 1371697 | 12/2003 |
| EP | 1388578 | 2/2004 |
| WO | WO 2007/035505 | 3/2007 |
| WO | WO2011103939 | 9/2011 |

* cited by examiner

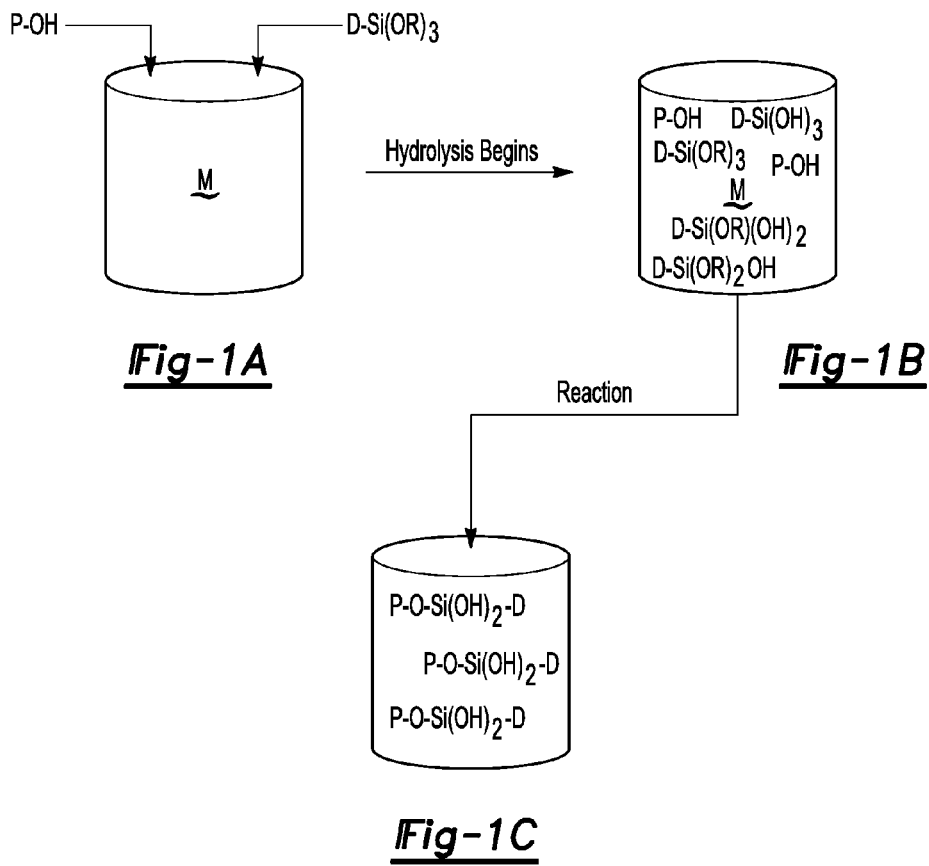
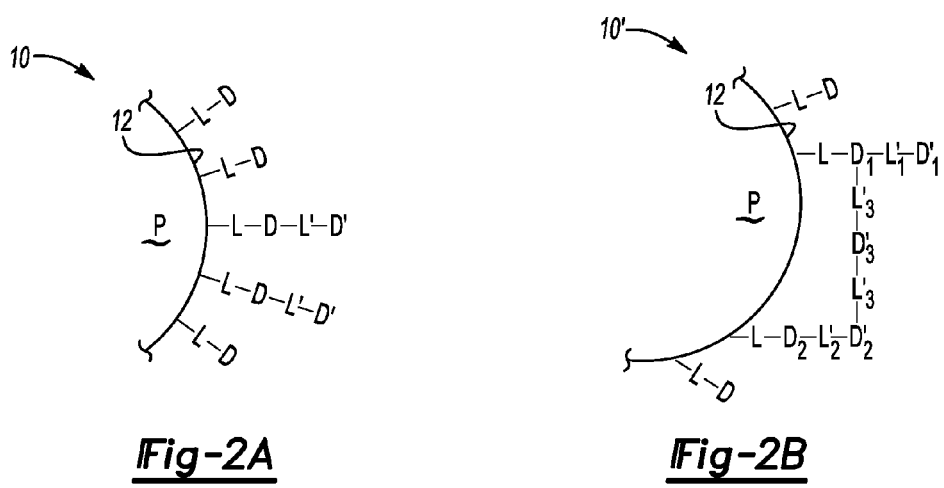

INKJET INK

BACKGROUND

Some aqueous inkjet inks are formulated with large metal oxide pigment particles; i.e., particles that have an effective particle size that is larger than 100 nm. Examples of such inks include $TiO_2$ pigment-based inks and ceramic pigment-based inks. In some instances, the large metal oxide pigment particles settle out of the aqueous medium of the ink during a period of nonuse, and the particles agglomerate in the sediment. It has been found that the agglomeration of settled pigment particles affects the long term usability of the inkjet ink. For instance, the agglomerated particles may compromise the jetting reliability of an inkjet pen, e.g., agglomerated particles may clog the nozzles of the inkjet pen during printing.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A through 1C, together, schematically depict an example of a method of making a pigment for an example of the inkjet ink of the present disclosure;

FIGS. 2A and 2B individually schematically depict examples of a portion of a pigment particle including reactive dispersant molecules attached to a surface thereof;

DETAILED DESCRIPTION

Figure 3:
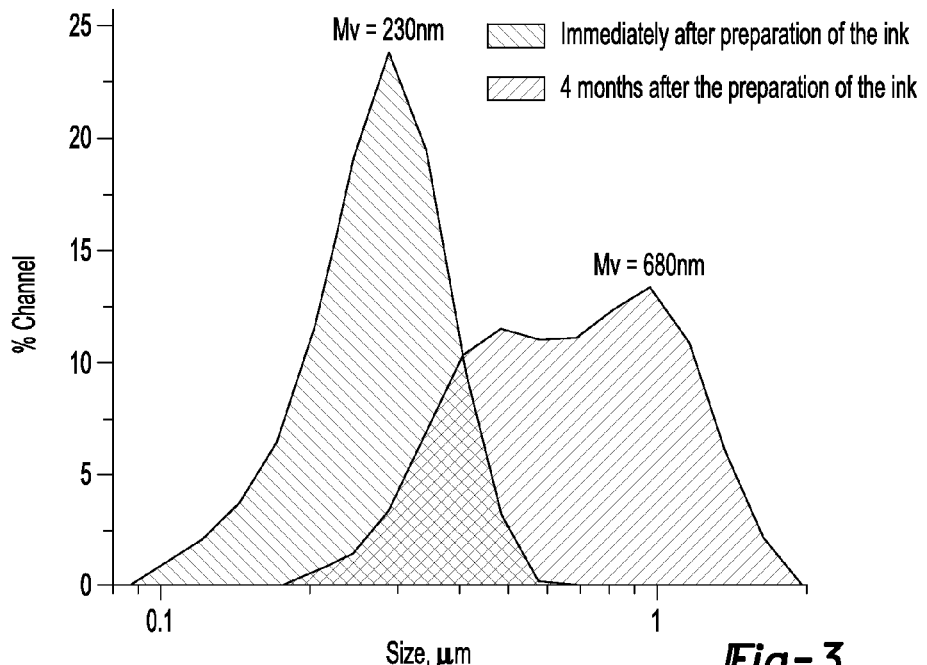
FIG. 3 is a graph showing the effect of particle agglomeration on a particle size distribution of un-coated metal oxide pigment particles in an aqueous inkjet ink dispersion immediately after the dispersion is prepared, and four months after the dispersion is prepared.

The present disclosure relates generally to inkjet inks.

Examples of the inkjet ink as disclosed herein include a pigment incorporated into an aqueous ink vehicle. The pigment includes metal oxide particles and a plurality of reactive dispersant molecules attached to the metal oxide particles. These reactive dispersant molecules are attached to the metal oxide particles through silanol linking groups. In some instances, additional reactive dispersant molecules are attached to at least some of the reactive dispersant molecules already attached to the metal oxide particles. These additional reactive dispersant molecules are attached to the dispersant molecules through silanol linking groups as well. It is believed that the reactive dispersant molecules attached to the metal oxide particles (i.e., the reactive dispersant molecules that are either directly or indirectly attached to the metal oxide) form a coating layer on the metal oxide particle surfaces. It is further believed that the coating layer is relatively thick. In one example, it is believed that the layer is thicker than a monolayer.

The pigment for the inkjet ink of the present disclosure includes coated pigment particles (i.e., metal oxide particles having reactive dispersant molecules attached thereto) individually having an effective diameter (assuming that each particle is not a perfect sphere) of at least 50 nm. In an example, the metal oxide particles individually have a particle size (i.e., effective diameter) ranging from about 0.05 μm (i.e., 50 nm) to about 5 μm. In another example, the metal oxide particles individually have a particle size that is up to about 3 μm. The inventors of the present disclosure have surprisingly found, however, that the settling rate of the large pigment particles in the inkjet ink of the present disclosure is reduced significantly, and particle agglomeration in sediment formed by the settling of the large pigment particles is substantially completely eliminated. It is believed that this is due, at least in part, to the presence of the thick coating layer.

In an example, the pigment particles may form a fluffy sediment during a period of nonuse of the inkjet ink, and such particles may be easily re-dispersed in the aqueous medium of the inkjet ink, e.g., via shaking, agitating, or the like. In an example, the printer for printing the ink may be equipped with some type of re-dispersion hardware for shaking, agitating, etc. the inkjet ink prior to printing. In another example, it may be recommended by, e.g., the ink manufacturer to remove the ink cartridge containing the ink from the printer, and to then manually shake the ink cartridge to re-disperse the particles into the aqueous medium of the ink. It may be recommended to perform this manual shaking periodically, such as prior to each printing job. It is believed that, for the inks disclosed herein, the shaking by the printer or manual shaking by the user is sufficient to re-disperse the particle sediment into the medium of the ink. This is unlike other ink compositions containing large and heavy pigment particles, where agglomeration of the particle sediment is irreversible, and the particles cannot be readily and/or easily re-dispersed in the aqueous medium by the printer or manually by the user.

Furthermore, the easy re-dispersion of the particles in the aqueous medium of the inkjet ink disclosed herein, in effect, leads to improved jetting reliability of the inkjet pen during printing of the ink to form a print.

Examples of the inkjet ink will now be described herein. As previously mentioned, the inkjet ink includes a pigment incorporated into an aqueous ink vehicle. As used herein, the term "aqueous ink vehicle" refers to water and perhaps one or more solvents to form a vehicle within which the pigment is incorporated to form examples of the inkjet ink. The aqueous ink vehicle may, in one example, include water with or without one or more additives. In another example, the aqueous ink vehicle includes a combination of water and one or more other solvents, with or without one or more additives. Some examples of additives that may be incorporated into the aqueous ink vehicle include surfactants, binders, pH buffers, biocides, and combinations thereof. Other additives that may be incorporated into the aqueous ink vehicle include viscosity modifiers and sequestering agents. Further, since the dispersant to be attached to the metal oxide particle is also effectively usable in the inkjet ink as an anti-kogation agent, it may not be suitable to include an additional anti-kogation agent in the aqueous ink vehicle.

In an example, one or more solvents may be included in the aqueous ink vehicle to reduce the rate of evaporation of the water and/or to control certain properties of the ink such as viscosity, pH, and surface tension. In instances where solvent(s) is/are used, the solvent(s) is/are present in an amount ranging from about 5 wt % to about 15 wt % of the inkjet ink.

Examples of solvents include aliphatic alcohols (e.g., primary aliphatic alcohols of 30 carbons or less and secondary aliphatic alcohols of 30 carbons or less), aromatic alcohols (e.g., primary aromatic alcohols of 30 carbons or less and secondary aromatic alcohols of 30 carbons or less), diols (e.g., 1,2-diols of 30 carbons or less, 1,3-diols of 30 carbons or less and 1,5-diols of 30 carbons or less), glycol ethers (e.g., ethylene glycol alkyl ethers and propylene glycol alkyl ethers), poly(glycol)ethers (e.g., poly(ethylene glycol)alkyl ethers, higher homologs of poly(ethylene glycol)alkyl ethers, poly(propylene glycol)alkyl ethers, and higher homologs of poly(propylene glycol)alkyl ethers), lactams, formamides (e.g., substituted and unsubstituted formamides), acetamides (e.g., substituted and unsubstituted acetamides), long chain alcohols, ethylene glycols, propylene glycols, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, diethylene glycol monoethyl ether (i.e., CARBITOL™, The Dow Chemical Co.), diethylene glycol monobutyl ether (i.e., butyl CARBITOL™, The Dow Chemical Co.), 2-ethoxyethanol (i.e., CELLOSOLVE®, The Dow Chemical Co.), ether derivatives, amino alcohols, and ketones. Some specific examples of solvents include ethoxylated glycerol, 2-methyl-1,3-propanediol, 2-methyl-2,4-pentanediol, 1,5-pentanediol, 2-pyrrolidone, 1-(2-hydroxylethyl)-2-pyrrolidinone, 2-ethyl-2-hydroxymethyl-1,3-propanediol, diethylene glycol, 3-methoxybutanol, 1,3-dimethyl-2-imidazolidinone, 1,2-hexanediol, 1,2-octanediol, 2,5-dimethyl-3-hexyne-2,5-diol, trimethylol propane, 3-hexyne-2,5-diol, sulfolane, 3-pyridyl carbinol, and pyridine derivatives.

As an additive, the aqueous ink vehicle may include a pH buffer, i.e., a chemical that may be used in the ink to adjust or to otherwise control the pH of the ink. Some examples of pH buffers include hydroxides of alkali metals and amines (e.g., lithium hydroxide, sodium hydroxide, and potassium hydroxide), amines (e.g., triethanolamine, diethanolamine, and dimethylethanolamine), hydrochloric acid, citric acid, and other bases or acids that do not interfere with the properties of the ink such as optical density. Some specific examples of pH buffers are commercially available from Sigma-Aldrich Co. (St. Louis, Mo.), and these examples include 2-(N-morpholino)ethanesulfonic acid (MES), 3-(N-morpholino)propanesulfonic acid (MOPS), TRIZMA®, 2-[Bis(2-hydroxyethyamino]-2-(hydroxymethyl)-1,3-propanediol (Bis-Tris), 3-(N-Morpholino)-2-hydroxypropanesulfonic acid (MOPSO), 2-[[1,3-dihydroxy-2-(hydroxymethyl)propan-2-yl]amino]ethanesulfonic acid (TES), 3-[[1,3-dihydroxy-2-(hydroxymethyl)propan-2-yl]amino]-2-hydroxypropane-1-sulfonic acid (TAPSO), triethanolamine (TEA), N-(2-Hydroxy-1,1-bis(hydroxymethyl)ethyl)glycine (TRICINE), [N,N-Bis(2-hydroxyethyl)glycine] (BICINE), N-Tris(hydroxymethyl)methyl-3-aminopropanesulfonic acid (TAPS), and N-(1,1-Dimethyl-2-hydroxyethyl)-3-amino-2-hydroxypropanesulfonic acid (AMPSO) in acid or salt form.

In an example, a single buffer may be incorporated into the aqueous ink vehicle. In another example, a combination of two or more buffers may be incorporated into the ink vehicle. Further, in instances where a buffer or a combination of buffers is used, each individual buffer may be present in an amount ranging from about 0.01 wt % to about 1.0 wt % of the ink.

A biocide may also be added to the aqueous ink vehicle, e.g., to inhibit the growth of microorganisms in the ink. Examples of biocides include benzoate salts, sorbate salts, a member of the NUOSEPT® family available from Ashland Inc. (Covington, Ky.) such as NUOSEPT® 495, a member of the UCARCIDE™ family available from the Dow Chemical Co. (Midland, Mich.) such as UCARCIDE™ 25, a member of the VANCIDE® family available from RT Vanderbilt Co. (Norwalk, Conn.) such as VANCIDE® MZ-96, and a member of the PROXEL™ family available from Arch Chemicals (Norwalk, Conn.). If a biocide is used, in an example, the biocide is present in an amount ranging from about 0.05 wt % to about 0.2 wt % of the inkjet ink.

One or more surfactants may be used in the aqueous ink vehicle, and examples of surfactants include anionic surfactants, non-ionic surfactants, and zwitterionic surfactants. Some examples of anionic surfactants include sodium or potassium salts of straight chain fatty acids, sodium and potassium salts of coconut oil fatty acids, sodium and potassium salts of tall oil fatty acids, amine salts, acylated polypeptides, linear alkyl benzene sulfonates, higher alkyl benzene sulfonates, benzene, toluene, xylene, cumenesulfonate, lignosulfonates, petroleum sulfonates, N-acyl-n-alkyltaurates, paraffin sulfonates, secondary n-alkanesulfonates, alpha olefin sulfonates, sulfosuccinic esters, alkyl naphthalene sulfonates, isoethionates, sulfuric acid ester salts, sulfated polyoxyethylenated straight-chain alcohols, sulfated triglycerides oils, phosphoric and polyphosphoric acid esters, and perfluorinated anionic surfactants.

Some examples of non-ionic surfactants include alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, aklanolamine condensates, alkanolamides, tertiary acetylenic glycols, polyoxyethylenated silicones, N-alkylpyrrolidones, and alkylpolyglycosides.

Some examples of zwitterionic surfactants include beta-N-alkylaminopropionic acids, N-alkyl-beta-iminodipropionic acids, imidazoline carboxylates, N-alkylbetaines, amine oxides, and sulfobetaines.

In an example, if a surfactant is used, the surfactant(s) is/are present in an amount ranging from about 0.01 wt % to about 2.0 wt % of the inkjet ink. In yet another example, the surfactant(s) is/are present in an amount ranging from about 0.1 wt % to about 1 wt % of the inkjet ink.

The ink vehicle may further include one or more binders, and these binders may be used to bind the ink to the medium upon which the ink is printed. The binder(s) that may be incorporated into the ink vehicle has a number average molecular weight that depends, at least in part, on the solubility of the binder in the liquid phase of the inkjet ink. For binders that are soluble in the ink vehicle, the binders are chosen from those having a number average molecular weight (MW) ranging from about 200 MW to about 15000 MW. For binders that are insoluble in the ink vehicle (e.g., which form an emulsion), the binders are chosen from those having a number average molecular weight of at least 200 MW. For non-soluble binders, there is no defined upper limited of the molecule weight. The binder may be selected from polyesters, polyester-melanines, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. In an example, if binder(s) is/are used, the amount of binder(s) in the ink ranges from about 0.1 wt % to about 10 wt % of the inkjet ink. In another example, the amount of binder(s) present in the ink ranges from about 2 wt % to about 6 wt %.

Water makes up the balance of the ink vehicle. In instances where the ink vehicle includes water but no solvents, the amount of water ranges from about 50 wt % to about 99 wt % of the ink. In instances where the ink vehicle includes a combination of water and one or more other solvents, the amount of water ranges from about 30 wt % to about 98 wt % of the ink.

The pigment that is incorporated into the aqueous ink vehicle may be present in an amount ranging from about 1 wt % to about 40 wt % of the inkjet ink. The pigment predominantly includes metal oxide particles and/or mixed metal oxide particles having a plurality of reactive dispersant molecules attached to an outer surface thereof. Metal oxides include oxides of a single element, while mixed metal oxides include oxides of multiple elements. It is to be understood that the reactive dispersant molecules coat the surfaces of the metal oxide particles and/or mixed metal oxide particles in a statistically random process. In this way, typically a majority of the metal oxide particles and/or mixed metal oxide particles may be coated with the reactive dispersant molecules while a much smaller amount of the metal oxides particles and/or mixed metal oxide particles may remain uncoated or may be coated with a very small amount (e.g., wt %) of reactive dispersant molecules relative to the other coated metal oxide particles and/or coated mixed metal oxide particles. It is further to be understood that the statistically random process may not apply perfectly, and that it is possible that all of the metal oxide particles and/or mixed metal oxide particles are coated with the reactive dispersant molecules.

In an example, the metal oxide particles are white particles, such as $TiO_2$ particles. In another example, the metal oxide particles and/or mixed metal oxide particles are chosen from metal oxides and/or mixed metal oxides having a refractive index ranging from about 1.6 to about 3.0, and in another example, metal oxides and/or mixed metal oxides having a refractive index ranging from about 1.8 to about 2.8. Other examples of the metal oxides or mixed metal oxides include oxides of zirconium (e.g., $ZrO_2$), oxides of aluminum (e.g., $Al_2O_3$), oxides of hafnium (e.g., $HfO_2$), oxides of niobium (e.g., $Nb_2O_5$), oxides of zinc (e.g., ZnO), oxides of dysprosium ($Dy_2O_3$), oxides of tantalum (e.g., $Ta_2O_5$), oxides of yttrium (e.g., $Y_2O_3$), mixed oxides of bismuth (e.g., $Bi_{12}SiO_{20}$), mixed oxides of lead (e.g., $PbTiO_3$), mixed oxides of strontium (e.g., $SrTiO_3$), mixed oxides of zirconium (e.g., $ZrY_2O_5$), mixed oxides of aluminum (e.g., $AlPO_4$), mixed oxides of barium (e.g., $BaTiO_3$), etc. Further, the size of each metal oxide particle (in terms of effective diameter assuming that the metal oxide particles are most likely not perfect spheres) ranges from about 0.1 µm to about 3 µm, and in another example, ranges from about 0.1 µm to about 1 µm. In yet another example, the size of each metal oxide particle ranges from about 0.15 µm to about 0.5 µm.

The reactive dispersant molecules that are attached to the metal oxide particles and/or mixed metal oxide particles are water soluble, and are molecules including a hydrophilic segment and a hydrolysable alkoxysilane moiety. In one example, the reactive dispersant molecules may individually include a single alkoxysilane moiety, and this alkoxysilane moiety may be attached to a terminal end of the hydrophilic segment of the reactive dispersant molecule. In another example, the reactive dispersant molecules may individually include one, two, or possibly more alkoxysilane moieties. For instance, one alkoxysilane moiety may be located at a terminal end of the hydrophilic segment, and the other alkoxysilane moiety/ies may be located along the backbone of the hydrophilic segment. In another instance, the hydrophilic segment may include an alkoxysilane moiety located at each terminal end (e.g., one alkoxysilane moiety at one end of the hydrophilic segment and another alkoxysilane moiety at the other end of the hydrophilic segment). In yet another instance, the hydrophilic segment may include an alkoxysilane moiety at one terminal end, another alkoxysilane moiety at the other terminal end, and yet another alkoxysilane moiety located along the backbone of the hydrophilic segment. It is believed that the reactive dispersant molecules may include more than three alkoxysilane moieties, and these alkoxysilane moieties may be distributed along the backbone of the hydrophilic segment.

The hydrophilic segment of the dispersant molecules enables the generally insoluble pigment to be dispersible in the aqueous ink vehicle. The hydrophilic segment includes a molecular structure having hydrophilic moieties to suitably disperse the pigment in the aqueous ink vehicle. It is believed that the size of the hydrophilic segment, and thus the size of the dispersant molecules affects i) the thickness of the coating of dispersant molecules formed on the metal oxide particles and/or mixed metal oxide particles, and ii) the anti-agglomeration effect of the metal oxide particles and/or mixed metal oxide particles in the sediment of the ink. For instance, a dispersion including long chain polymer dispersants (e.g., polyethers greater than 5 kiloDaltons (kDa) to 10 kDa) will have a larger viscosity than a dispersion that includes dispersants with shorter chain lengths (e.g., an inorganic phosphate). This larger viscosity may deleteriously affect the jetting reliability of the ink from an inkjet pen (e.g., by nozzle plugging, etc.). However, these types of long chain polymer dispersants tend to form thicker coatings on the metal oxide particle surface, and this thicker coating may reduce or even prevent agglomeration of the particles from sediment formed during a period of nonuse of the dispersion. On the other hand, a dispersion including small dispersant molecules (e.g., an inorganic phosphate) will have practically no deleterious effect on the viscosity of the dispersion, and thus no deleterious effect on the jetting reliability of the dispersion by an inkjet pen. The short dispersant molecules, however, do not form the desired thick coating on the metal oxide particles, and such particles tend to agglomerate when the particles settle out of the liquid phase of the dispersion.

The reactive dispersant molecules to be coated on the metal oxide and/or mixed metal oxide particles for the examples of the inkjet ink of the present disclosure include a hydrophilic segment chosen from one that behaves like the small dispersant molecules in terms of viscosity, but also enables the dispersant molecules to form desirably thick coatings on respective surfaces of the metal oxide particles. By virtue of the thick coating formed on the particle surfaces, it has been found that metal oxide particle agglomeration can be reduced or even eliminated. It has also been found that the viscosity of the dispersion is such that the dispersion may be readily jetted from an inkjet pen including piezoelectric inkjet pens and thermal inkjet pens. In an example, the hydrophilic segment of the reactive dispersant molecules is larger than an inorganic phosphate, but not as large as a polymeric dispersant.

In an example, the hydrophilic segment of the reactive dispersant molecules has a number average molecular weight (MW) ranging from about 150 to about 10,000. In another example, the MW of the hydrophilic segment of the reactive dispersant molecules ranges from about 150 to about 5,000. In yet another example, the MW of the hydrophilic segment of the reactive dispersant molecules ranges from about 150 to about 3,000. In one specific example, the MW of the hydrophilic segment of the reactive dispersant molecules is about 192, and in another specific example, the MW of the hydrophilic segment of the reactive dispersant molecules is about 230. Some examples of the hydrophilic segment include molecules containing water-soluble polyether chains such as, e.g., polyethylene glycol (PEG), or copolymers of PEG and polypropylene glycol (PPG) where the ratio of PEG-to-PPG is greater than or equal to 1. Other examples of the hydrophilic segment include carbon-based molecules containing an anionic species such as a phosphonate or a carboxylate.

The hydrolysable alkoxysilane moiety is an alkoxysilane group attached to the hydrophilic segment of the reactive dispersant molecule, where such alkoxysilane group may be readily hydrolyzed when dissolved in an aqueous environment (e.g., within the aqueous ink vehicle) to produce a silanol group. The alkoxysilane moiety is nonionic or anionic, and has the general structure of —Si(OR)$_3$, where R may be H, CH$_3$, C$_2$H$_5$, or any of the examples provided for R$^4$, R$^5$, or R$^6$ below. It is believed that alkoxysilane moieties having three or more carbons is less desirable, in part because it has been found that the longer/larger chain length of the alkoxysilane moiety slows down the rate of hydrolysis of the alkoxysilane and reduces its reactivity with the metal oxide and/or mixed metal oxide particle surface.

It is desirable that each reactive dispersant molecule, as a whole, is a short molecule so that the molecule contributes very little, if at all, to the viscosity of the inkjet ink. In an example, the short dispersant molecule includes less than or equal to 20 PEG segments with polyether alkoxysilane moieties. This is particularly true at high pigment loading (e.g., greater than 20 wt %) of the inkjet ink. In one example, the amount of reactive dispersant molecules ranges from about 9 wt % with respect to the wt % of the metal oxide and/or mixed metal oxide to about 100 wt % with respect to the wt % of the metal oxide and/or mixed metal oxide. In another example, the amount of reactive dispersant molecules ranges from about 10 wt % to about 50 wt %, and in yet a further example, the amount of reactive dispersant molecules ranges from about 30 wt % to about 50 wt % with respect to the wt % of the metal oxide and/or mixed metal oxide. The ranges mentioned above may, in some instances, include an excess of dispersant which may improve the jetting reliability of the inkjet. As used herein, the term "excess" refers to an amount of reactive dispersant molecules that is not attached to the metal oxide particles, and remains in the liquid phase of the dispersion (i.e., remains in solution). It is believed that the jetting reliability may be improved by the excess of dispersant molecules because the silane coupling agents of the dispersant molecules have a functionality (e.g., a polyethylene glycol functionality) that is chemically similar to those inkjet additives (e.g., LEG-1) that are often incorporated into inkjet ink formulations to improve jetting reliability. In one example, the inkjet ink may contain about 30 wt % of TiO$_2$ pigment, where the reactive dispersant molecules make up about 50 wt % of the TiO$_2$ pigment.

In an example, the reactive dispersant molecule is i) water soluble, ii) has the hydrolysable alkoxysilane moiety, and iii) has the hydrophilic segment containing a water soluble polyether chain or anionic hydrophilic groups such as carboxylate groups and/or phosphonate groups.

An example of the structure of a reactive dispersant molecule is given by structure (I) below. It is believed that this reactive dispersant molecule structure, when attached to the metal oxide and/or mixed metal oxide particles, will enable the inkjet ink (which may also be referred to as a metal oxide dispersion) to be jettable from an inkjet printhead. The example structure (I) is:

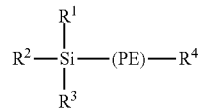

(Structure I)

where R$^1$, R$^2$, and R$^3$ are hydroxyl groups, linear alkoxy groups, or branched alkoxy groups. In some examples, R$^1$, R$^2$, and R$^3$ are linear alkoxy groups having from 1 to 5 carbon atoms. In yet other examples, R$^1$, R$^2$, and R$^3$ are —OCH$_3$ or —OC$_2$H$_5$. R$^4$ is hydrogen, a linear alkyl group, or a branched alkyl group. In some examples, R$^4$ is an alkyl group having from 1 to 5 carbon atoms.

Further, PE in the alkoxysilane dispersant structure I is a polyether oligomer chain segment of the structural formula [(CH$_2$)$_n$—CH(R)—O]$_m$, attached to the Si through an Si—C bond, where n is an integer ranging from 0 to 3, m is an integer greater than or equal to 2, and R is H or a chain alkyl group. R in the polyether oligomer may also be a chain alkyl group having 1 to 3 carbon atoms, such as CH$_3$ or C$_2$H$_5$. In some examples, m is an integer ranging from 2 to 30, and in other examples, m is an integer ranging from 5 to 15. The polyether chain segment PE may include repeating units of the PEG chain segment (—CH$_2$CH$_2$—O—), or a combination of PEG segments and PPG (—CH$_2$—CH(CH$_3$)—O—) segments. It is believed that the polyether chain PE may include repeating units of PPG segments alone, particularly when the number of PPG segments is small. As such, PE constitutes the hydrophilic segment of the dispersant.

Another example of the structure of the reactive dispersant molecule is given by structure (II) below:

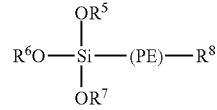

(Structure II)

where R$^5$, R$^6$, and R$^7$ are hydrogen, linear alkyl groups, or branched alkyl groups. In some examples, R$^5$, R$^6$, and R$^7$ are linear alkyl groups having from 1 to 3 carbon atoms in chain length, and in other examples R$^5$, R$^6$, and R$^7$ are —CH$_3$ or —C$_2$H$_5$. R$^8$ may be any of the examples of R$^4$ described above, and PE is the same as described above for Structure I.

Yet another example of the structure of the reactive dispersant molecule is given by Structure III below:

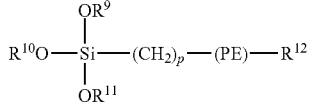

(Structure III)

where R$^9$, R$^{10}$, and R$^{11}$ are the same as R$^5$, R$^6$, and R$^7$, respectively, of Structure II above. (CH$_2$)$_p$ is a linking group, where p is an integer ranging from 3 to 8. Further, R$^{12}$ is the same as R$^8$ of Structure II and R$^4$ of Structure I, and PE is the same as PE of Structures I and II.

Each of the structures above is a polyether alkoxysilane reactive dispersant molecule. Some specific examples of polyether alkoxysilanes that may be used for the reactive dispersant molecules include (CH$_3$O)$_3$Si—(CH$_2$CH$_2$O)$_m$—

H, $(CH_3CH_2O)_3Si—(CH_2CH_2O)_m—H$, $(CH_3O)_3Si—(CH_2CH_2O)_m—CH_3$, $(CH_3CH_2O)_3Si—(CH_2CH_2O)_m—CH_3$, $(CH_3O)_3Si—(CH_2CH_2O)_m—CH_2CH_3$, $(CH_3CH_2O)_3Si—(CH_2CH_2O)_m—CH_2CH_3$, $(CH_3O)_3Si—(CH_2CH_3O)_m—H$, $(CH_3CH_2O)_3Si—(CH_2CH(CH_3)O)_m—H$, $(CH_3O)_3Si—(CH_2CH(CH_3)O)_m—CH_3$, and $(CH_3CH_2O)_3Si—(CH_2CH(CH_3)O)_m—CH_3$. Some other specific examples of polyether alkoxysilanes that may be used for the reactive dispersant molecules include $HO(CH_2CH_2O)_m—(CH_2)_3—Si(OCH_3)_3$, $HO(CH_2CH_2O)_m—(CH_2)_3—Si(OCH_2CH_3)_3$, $CH_3O(CH_2CH_2O)_m—(CH_2)_3—Si(OCH_3)_3$, $CH_3O(CH_2CH_2O)_m—(CH_2)_3—Si(OCH_2CH_3)_3$, $C_2H_5O(CH_2CH_2O)_m—(CH_2)_3—Si(OCH_3)_3$, $C_2H_5O(CH_2CH_2O)_m—(CH_2)_3—Si(OCH_2CH_3)_3$, $HO(CH_2CH(CH_3)O)_m—(CH_2)_3—Si(OCH_3)_3$, $HO(CH_2CH(CH_3)O)_m—(CH_2)_3—Si(OCH_2CH_3)_3$, $CH_3O(CH_2CH(CH_3)O)_m—(CH_2)_3—Si(OCH_3)_3$, and $CH_3O(CH_2CH(CH_3)O)_m—(CH_2)_3—Si(OCH_2CH_3)_3$. In any of the previous examples, the variable m may be an integer equal to 2 or greater. In some examples, m is an integer ranging from 2 to 30 and, in some other examples, m is an integer ranging from 5 to 15.

It is to be understood that each metal oxide and/or mixed metal oxide particle of the pigment includes hydroxyl groups on its surface, and these hydroxyl groups naturally form by the reaction of the metal oxide and/or mixed metal oxide particle and water. Each of the hydroxyl groups will react with a silanol linking group of a reactive dispersant molecule to chemically attach or bond the reactive dispersant molecule to the metal oxide and/or mixed metal oxide particle surface, thereby forming the pigment. An example of a method of making the pigment for the inkjet ink will now be described herein in conjunction with FIGS. 1A through 1C.

Referring now to FIG. 1A, metal oxide and/or mixed metal oxide particles having hydroxyl groups attached thereto and reactive dispersant molecules having an alkoxysilane moiety are added to an aqueous medium M. The metal oxide and/or mixed metal oxide particles having hydroxyl groups attached thereto are shown in the figures as P—OH, where P is the particle. The reactive dispersant molecules having an alkoxysilane moiety are shown in the figures as $D-Si(OR)_3$, where D is the portion of the reactive dispersant molecules including the dispersant functionality (e.g., the hydrophilic segment including polyether group(s), phosphonate group(s), etc.) and $Si(OR)_3$ is the alkoxysilane moiety where R may be H, $CH_3$, $C_2H_5$, or any of the examples provided for $R^4$, $R^5$, or $R^6$ above. As such, $D-Si(OR)_3$ may represent any of structures I, II or III provided herein, where D includes the PE segment.

The reactive dispersant molecules will then dissolve in the aqueous medium M. During dissolution, the alkoxysilane moiety of each of the reactive dispersant molecules hydrolyzes inside the aqueous medium M. The hydrolysis of the alkoxysilane moiety forms a silanol group (i.e., a linking group) attached to the dispersant functionality D. This step is shown in FIG. 1B, where the example of the dispersant functionality D having the silanol group attached thereto is shown as $D-Si(OR)_3$, $D-Si(OR)_2OH$, $D-Si(OR)(OH)_2$, and $D-Si(OH)_3$, all of which represent a partially and/or fully hydrolyzed alkoxysilane group. FIG. 1B also shows the particles having the hydroxyl groups attached thereto (i.e., P—OH).

Some of the silanol groups (—SiOH) react with hydroxyl groups (—OH) of the metal oxide particles P to chemically bond the dispersant functionality D to the metal oxide particles P (e.g., $P—O—Si(OH)_2-D$), and this is shown in FIG. 1C. Generally, for silane coupling agent-based dispersant molecules (e.g., alkoxysilanes), the silicon atom is bonded to three oxygen atoms (one of which bonds to the particle P), and the silicon atom will form a single bond with a carbon atom of the dispersant functionality D (which includes the hydrophilic segment). The outcome of these reactions includes a reacted dispersant molecule (i.e., D+L) attached to an outer surface of each of the metal oxide and/or mixed metal oxide particles P. An example of this is shown in FIG. 2A.

In the example of FIG. 2A, reactive dispersant molecules have been reacted, and five of the dispersant functionalities D of these reacted dispersant molecules are attached to the particle surface 12 through respective silanol linking groups L. It is to be understood that the number of reacted dispersant molecules (i.e., D+L) shown in FIG. 2A is provided merely for purposes of illustrating that the reacted dispersant molecules attach to the particle P, and that the particle P may have many more (or possibly less) reacted dispersant molecules than that shown in FIG. 2 that are directly attached to the particle P. For instance, the particle P may have tens, hundreds, or possibly thousands of reacted dispersant molecules D+L that are directly attached to the particle surface 12. It is believed that the number of reacted dispersant molecules D+L that attach to the particle P produces a thick hydrophilic coating on the particle P. This coating is believed to be thicker than a monolayer.

Additionally, it is believed that the plurality of reacted dispersant molecules D+L that are chemically attached to the particle surface 12 forms a hydrophilic coating thereon. As previously mentioned, it is believed that this hydrophilic coating is relatively thick (e.g., thicker than a monolayer), and the thickness of the coating causes the pigment 10 (which includes the metal oxide particle P and the coating of reacted dispersant molecules D+L) to have a particle size that is much larger than 100 nm. This thick coating may therefore increase the hydrodynamic radius of the metal oxide and/or mixed metal oxide particles, which reduces their effective density and settling rate. Furthermore, without being bound to any theory, it is believed that the presence of the thick coating formed on the individual metal oxide and/or mixed metal oxide particles prevents agglomeration of the particles upon settling, and the sediment produced is relatively fluffy. The inventors of the present disclosure have found that the fluffy sediment may be easily re-dispersed in the aqueous medium with some shaking or agitating.

Referring back to FIG. 1C, briefly, all of the particles P shown in the example depicted in FIG. 1C have reacted dispersant molecules D+L attached thereto. In some instances, it may be possible that some of the particles P may have reacted dispersant molecules D+L attached thereto, while other particles P remain unreacted. As such, some reacted dispersant molecules D+L may remain unattached and in the bulk liquid phase. It is believed, however, that at the loading of the reactive dispersant molecules in the medium (e.g., from about 10 wt % to about 100 wt % with respect to the wt % of metal oxide/mixed metal oxide particles), the number of dispersant molecules greatly exceeds the number of metal oxide/mixed metal oxide particles in the medium. For at least this reason, it is believed that hardly any of the metal oxide/mixed metal oxide particles in the medium will remain uncoated, and a minimal amount of the reacted dispersant molecules D+L will remain in the bulk liquid phase. It is believed that in the examples disclosed herein, the presence of any unattached reacted dispersant molecules in the ink does not deleteriously affect the viscosity of the ink, and this is particularly beneficial for inkjet printing (e.g., thermal inkjet printing, piezoelectric inkjet printing, and the like).

In an example, some of the reacted dispersant molecules D+L may include more than one silanol linking group L; e.g., one silanol linking group L at each terminal end of the dispersant functionality D. In this example, the dispersant functionality D may attach itself to the particle surface 12 through one of the silanol linking groups L, and may attach itself to an adjacent dispersant functionality D through the other silanol linking group L. The adjacent dispersant functionality D may or may not have already been attached to the particle surface 12.

In an example, the pigment may also include a plurality of additional reacted dispersant molecules (see D'+L' in FIG. 2A) that are indirectly attached to the particle surface (e.g., a reacted dispersant molecule (D+L) is formed between the additional reacted dispersant molecule (D'+L') and the metal oxide particle surface 12). These additional reacted dispersant molecules (D'+L') are the same as the reacted dispersant molecules (D+L) described above. It is to be understood that the additional reacted dispersant molecules (D'+L') become part of the coating formed on the particle surface 12. By the presence of the additional reacted dispersant molecules (D'+L'), it is believed that the coating formed on the particle surface 12 becomes thicker than when the particle surface includes the reacted dispersant molecules (D+L) alone. It is believed, for instance, that the thickness of the coating formed by the reacted dispersant molecules (D+L) (e.g., which may bind to one another as shown in FIG. 2B), or by the combination of reacted dispersant molecules (D+L) and additional reacted dispersant molecules (D'+L') (e.g., where D'+L' binds to D+L; D'+L' binds to another D'+L', etc.) is thicker than a monolayer.

Referring again to the example depicted in FIG. 2A, the additional reacted dispersant molecules are identified as D'+L', and these molecules D'+L', in this example, are attached to some of the reacted dispersant molecules D+L that are already attached to the particle surface 12. The example depicted in FIG. 2A also includes additional reacted dispersant molecules D'+L', where each attached to a respective dispersant functionality D of the reacted dispersant molecule D+L. It is to be understood that the example shown in FIG. 2A is illustrative, and that the number of additional reacted dispersant molecules D'+L' is not limited. In an example, many more additional reacted dispersant molecules D'+L' may be attached to other dispersant functionalities D.

The additional dispersant functionalities D' are attached to the dispersant functionalities D through the silanol linking group L'. In an example, the silanol linking group L' is located at a terminal end of the additional reacted dispersant molecule D'+L'. Although not shown in FIG. 2A, it is believed that another additional reacted dispersant molecule may attach to an end of the additional reacted dispersant molecule D'+L' that is indirectly attached to the particle P, and so on. In this way, chains of reacted dispersant molecules may form on the particle surface 12.

It is to be understood that additional reacted dispersant molecules (e.g., D'+L') may attach to a reacted dispersant molecule D+L or to an additional reacted dispersant molecule D'+L' wherever there is a silanol linking group L, L'. In instances where the silanol linking group L, L' is located along the backbone of the dispersant functionality D/additional dispersant functionality D', another additional reacted dispersant molecule D'+L' may then attach to the backbone of the dispersant functionality D/additional dispersant functionality D' rather than at a terminal end thereof. In instances where a reacted dispersant molecule D+L/additional reacted dispersant molecule D'+L' includes several silanol linking groups L, L', another reacted dispersant molecule may attach to each of the silanol linking group L, L'. Thus, for instance, a reacted dispersant molecule D+L/additional reacted dispersant molecule D'+L' that includes three silanol linking groups L, L' may have three other reacted dispersant molecules attached thereto; i.e., one reacted dispersant molecule attached to each of the silanol linking groups L, L'.

In another example, an additional reacted dispersant molecule D'+L' may attach to two adjacent dispersant functionalities D, thereby forming a bridge structure. This example is shown in FIG. 2B, where the pigment 10' includes the metal oxide particle P having a plurality of dispersant functionalities D (including $D_1$ and $D_2$) attached to the surface 12 thereof through silanol linking groups L. The pigment 10' further includes additional dispersant functionalities $D_1'$ and $D_2'$ attached to some of the dispersant functionalities (e.g., $D_1$ and $D_2$, respectively) through the silanol linking group $L_1'$, $L_2'$. In this example, still another additional reacted dispersant molecule $D_3'$, $L_3'$ bridges the dispersant functionality $D_1$ and the additional dispersant functionality $D_2'$. The additional dispersant functionality $D_3'$ attaches to the adjacent dispersant functionalities $D_1$, $D_2'$ through silanol linking groups $L_3'$ located at each terminal end of the additional dispersant functionality $D_3'$.

It is to be understood that each silanol linking group L, L' may form up to three separate bonds. For example, a dispersant functionality D may utilize a single silanol linking group L to attach itself to the particle surface 12. The single silanol linking group L may also attach to two other dispersant functionalities D/additional dispersant functionalities D'.

Although some configurations of the direct and indirect attachment of the reacted dispersant molecules to the metal oxide and/or mixed metal oxide particle surface have been described above, it is envisioned that other configurations may also occur.

Also disclosed herein is a method of making an inkjet ink. In this method, the pigment 10, 10' is prepared utilizing the examples of the method described above in conjunction with FIGS. 1A through 1C. The pigment 10, 10' is then incorporated into an aqueous ink vehicle. Examples of the aqueous ink vehicle are provided above.

To further illustrate the present disclosure, examples are given herein. It is to be understood that these examples are provided for illustrative purposes and are not to be construed as limiting the scope of the present disclosure.

EXAMPLES

Comparative Example 1

An aqueous inkjet ink was prepared by incorporating metal oxide particles into an aqueous ink vehicle. About 12 wt % of $TiO_2$ particles were added to water and from about 1 wt % to about 2 wt % of a sodium polyphosphate dispersant (where the wt % of the sodium polyphosphate dispersant was with respect to the wt % of $TiO_2$ particles).

The metal oxide particles were selected from $TiO_2$ particles having a particle size ranging from about 150 nm to about 2 μm. The bulk density of the $TiO_2$ particles according to literature is about 4.2, which is significantly higher than that of the aqueous ink vehicle, which is about 1.0 to about 1.2. It was found that the combination of the high bulk density and large particle size of the $TiO_2$ particles increased the settling rate of the pigment during a period of nonuse of the inkjet ink. It was found that the $TiO_2$ particles settled out of the aqueous ink vehicle within a few days.

By visual observation (and as illustrated by the particle size data discussed below), it was also found that the $TiO_2$ particles in the sediment agglomerated, and that the agglomerated particles compacted the sediment (e.g., the layer of sediment appears to be much thinner when the particles are compacted than when there are not compacted). Upon printing the ink, the compacted sediment clogged the ink-feeding channels and/or fluidic architecture of the inkjet printing system, resulting in unrecoverable plugging/clogging of the nozzles of the inkjet pen.

FIG. 3 is a graph showing the effect of particle agglomeration on the particle size distribution of the $TiO_2$ particles in the aqueous ink vehicle. In particular, FIG. 3 is a histogram representing the percent of the total particle population present (i.e., % channel) having a certain particle size range. The particle size of the $TiO_2$ particles was measured immediately after the ink was prepared using a NANOTRACK® particle size analyzer (Microtrack Corp., Montgomeryville, Pa.), and the measurements were plotted on the graph shown in FIG. 3. The average particle size $M_v$ of the $TiO_2$ particles immediately after the ink was prepared was determined to be about 233 nm. The ink was then set aside for a period of four months (or 120 days), after which the particle size of the $TiO_2$ was measured again. This data is also plotted on the graph shown in FIG. 3. The average particle size $M_v$ of the $TiO_2$ particles after four months was significantly higher than the average particle size of the $TiO_2$ particles immediately after the ink was prepared. The average particle size $M_v$ of the $TiO_2$ particles after four months was determined to be about 680 nm. This significant increase in particle size is evidence of particle agglomeration and compaction after a four month period of time.

It was also found that the agglomerated particles in the inkjet could not be re-dispersed in the aqueous ink vehicle by simple agitation. Upon stirring and shaking alone, for example, the agglomerated particles could not be re-dispersed in the aqueous ink vehicle as single $TiO_2$ particles.

Example 2

Another aqueous inkjet ink was prepared by incorporating metal oxide particles into an aqueous ink vehicle. The metal oxide particles for this ink included $TiO_2$ particles coated with a polyethyleneglycol dispersant attached through a silanol linking group. The ratio of $TiO_2$ particles to dispersant was 10:1. The aqueous ink vehicle into which the coated $TiO_2$ particles were added is shown in Table 1 below:

TABLE 1

Formulation of the aqueous ink vehicle for Example 2

| Components of the ink vehicle | Amount (wt %) |
| --- | --- |
| LEG-1 | 5.00 |
| 2-Pyrrolidinone | 9.00 |
| Trizma ® Base | 0.20 |
| Proxel ® GXL | 0.10 |
| Surfynol ® 465 (Air Products, Allentown, PA) | 0.20 |
| Water | Up to 100% |

The $TiO_2$ particles had a particle size ranging from about 150 nm to about 2 µm, and the bulk density of the pigment was again determined to be significantly higher than that of the aqueous ink vehicle. It was found that the coated $TiO_2$ particles of this example settled out of the aqueous ink vehicle within a few days. However, the sediment formed from the ink in this example was much thicker (e.g., 2-3 times thicker) than the sediment formed from the comparative ink in Example 1. The thicker sediment was an indication that the coated $TiO_2$ particles were not agglomerated or compacted, and could be re-dispersed into the initial state. This indication was confirmed, as discussed below.

Figure 4:
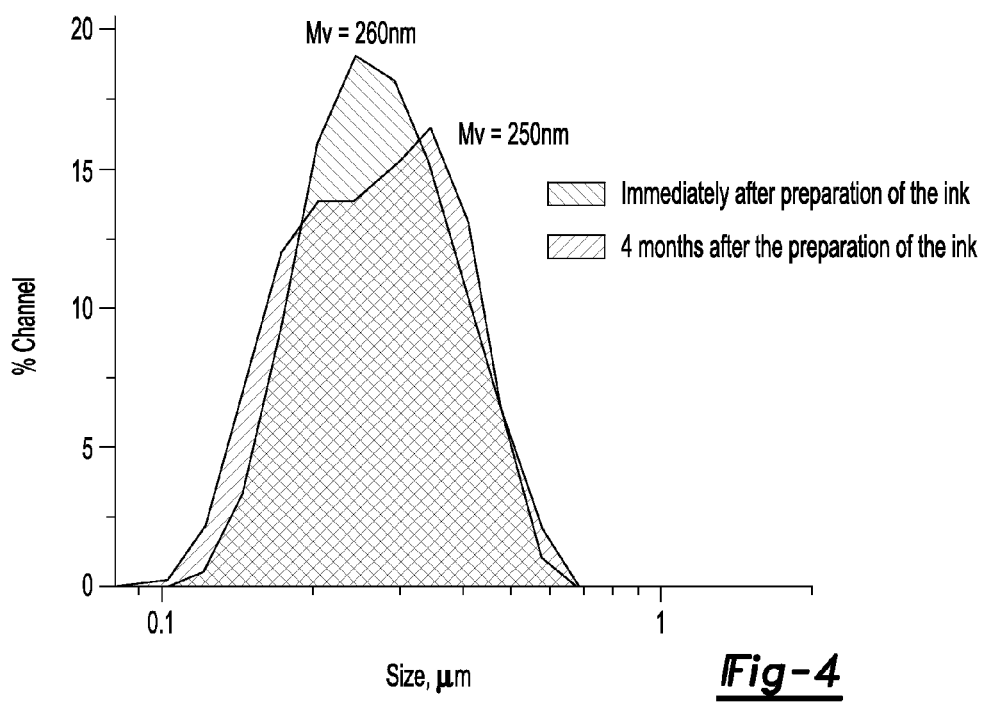
FIG. 4 is a graph showing the effect of particle agglomeration on a particle size distribution of metal oxide pigment particles of an example of the inkjet ink of the present disclosure immediately after the dispersion is prepared, and four months after the dispersion is prepared.

In contrast to Comparative Example 1, the $TiO_2$ particles in the sediment in this Example did not agglomerate. FIG. 4 is a graph showing the effect of particle agglomeration on the particle size distribution of the coated $TiO_2$ particles in the aqueous ink vehicle. In particular, FIG. 4 is a histogram representing the percent of the total particle population present (i.e., % channel) having a certain particle size range. The particle size of the coated $TiO_2$ particles was measured immediately after the ink was prepared, and the measurements were plotted on the graph shown in FIG. 4. The average particle size $M_v$ of the coated $TiO_2$ particles immediately after the ink was prepared was determined to be about 260 nm. The ink was then set aside for a period of four months (or 120 days), after which the particle size of the coated $TiO_2$ was measured again. These results are also plotted on the graph shown in FIG. 4. The average particle size $M_v$ of the coated $TiO_2$ particles after four months was about the same as the average particle size of the coated $TiO_2$ particles immediately after the ink was prepared. The average particle size $M_v$ of the coated $TiO_2$ particles after four months was determined to be about 250 nm. The fact that there was no significant change in the average particle size of the coated $TiO_2$ particles is evidence that no agglomeration or compaction in the sediment occurred after four months of nonuse of the ink. This is in sharp contrast to the results shown for the comparative ink in FIG. 3.

It was also found that the particles that settled out of the liquid phase of the inkjet ink in this Example could be re-dispersed in the aqueous ink vehicle by simple agitation. Upon stirring and shaking alone, for example, the particles were re-dispersed in the aqueous ink vehicle.

Example 3

Four aqueous inkjet inks (Inks 1, 2, 3, and 4) were prepared that included coated $TiO_2$ nanoparticles incorporated in an aqueous ink vehicle. The $TiO_2$ nanoparticles came from a nanoparticle $TiO_2$ powder (Ti-Pure R-900 available from E.I. du Pont de Nemours and Co., Wilmington, Del.). Ink 1 included the $TiO_2$ nanoparticles coated with a dispersant including a polyether hydrophilic segment (SILQUEST® A-1230 available from Momentive Performance Materials, Albany, N.Y.), Ink 2 included the $TiO_2$ nanoparticles coated with a dispersant including a carboxylated hydrophilic segment (i.e., carboxyethylsilanetriol, disodium salt), Ink 3 included the $TiO_2$ nanoparticles coated with a dispersant including an amino hydrophilic segment (i.e., 3-aminopropylsilanetriol), and Ink 4 included the $TiO_2$ nanoparticles coated with a dispersant including a phosphonated hydrophilic segment (i.e., 3-(trihydroxysilyl)propyl methylphosphonate, monosodium salt). The dispersants for Inks 2, 3, and 4 are commercially available from Gelest, Inc. (Morrisville, Pa.).

To form the respective dispersions, the components were milled utilizing a Netzsch MiniCer (available from Netzsch Fine Particle Technology, Exton, Pa.). To form the dispersions for Inks 1, 3 and 4, a dispersant-to-metal oxide particle ratio of about 0.13 was used, and to form the dispersion for Ink 2, a dispersant-to-metal oxide particle ratio of about 0.1 was used. Each of the resulting dispersions contained about 47 wt % of the coated $TiO_2$ nanoparticles, and the average particle size was measured to be about 233 nm using a NANOTRACK® particle size analyzer (Microtrack Corp., Montgomeryville, Pa.).

The respective dispersions were then used to produce Inks 1, 2, 3, and 4. Each of inks 1, 2, 3, and 4 included about 12 wt % of the coated $TiO_2$ nanoparticles (taken from the respective dispersions discussed above), 5 wt % LEG-1, 9 wt % 2-pyrrolidinone, 0.2 wt % Trizma® Base, 0.1 wt % Proxel® GXL, 0.2 wt % Surfynol®465, and a balance of water.

Each of the Inks 1, 2, 3, and 4 was tested to determine which dispersant, when coated on the $TiO_2$ particles, rendered the inkjet ink more stable (i.e., exhibiting desirable long term stability). The particle size $M_v$ of the coated $TiO_2$ particles was measured immediately after the Inks 1, 2, 3, and 4 were prepared, and after extended aging of the Inks 1, 2, 3, and 4 upon re-dispersing the pigment by container shaking. The results of the measurements are provided in Table 2 below:

TABLE 2

Effect of hydrophilic segments of the reactive dispersant molecules on long term stability of the inkjet ink

| Ink | Dispersant (i.e., Disp) Functionality | $TiO_2$:Disp | Aging, months | Mv (nm) initial | Mv (nm) after | Change, % of Mv | D50(nm) initial | D50(nm) after | Change, % of D50 |
|---|---|---|---|---|---|---|---|---|---|
| 1 | polyether | 8:1 | 16 | 225 | 224 | −0.3% | 223 | 217.6 | −7.3% |
| 2 | carboxyl | 10:1 | 16 | 232 | 246 | 6% | 214 | 236 | 10.3% |
| 3 | tri-amino | 8:1 | 13 | 233 | 330 | 41.5% | 228 | 319 | 40% |
| 4 | phosphonate | 8:1 | 8 | 233 | 232 | −0.4% | 227 | 224 | −1.4% |

In Table 2, $TiO_2$:Disp is the ratio of $TiO_2$ particles to dispersant, Mv initial refers to the volume-weighted mean particle diameter immediately after forming the ink, Mv after refers to the volume-weight mean particle diameter after aging of the ink, and the change % refers to the percent change between Mv initial and Mv after. Further, D50 initial refers to the mass median diameter (i.e., the average particle diameter by mass) immediately after forming the ink, and D50 after refers to the mass median diameter after aging of the ink. The % change of D50 refers to the percent change between D50 initial and D50 after.

The results in Table 2 suggest that the most robust dispersants are alkoxysilane dispersants having a polyether hydrophilic segment (i.e., polyether functionality) or a phosphonated hydrophilic segment (i.e., phosphonate functionality). These conclusions may be drawn from the small % changes (i.e., no particle size increase within experimental error) seen in volume-weight mean particle diameter and mass median diameter that are exhibited by Inks 1 and 4. The dispersant including the carboxylate functionality has a slight particle size increase, and thus is also believed to be a relatively robust dispersant for preventing agglomeration and enabling re-dispersibility. It is believed that the dispersants including phosphonate and carboxylate functionalities provide a combination of anionic and steric stabilization (i.e., mid-size molecules forming thicker layers).

Although sedimentation of large (and thus heavy) metal oxide particles in an aqueous inkjet ink cannot be eliminated completely, the examples of the inkjet ink disclosed herein show that the coated metal oxide/mixed metal oxide particles do not agglomerate or form a compact sediment upon settling and may be easily re-dispersed by simple agitation. In other words, there is no long term agglomeration of the metal oxide/mixed metal oxide particles of the inkjet ink. This enables the use of large and heavy metal oxide particles for inkjet inks that are printable from a thermal inkjet pen.

As previously mentioned, the examples of the inkjet ink disclosed herein include pigment particles including metal oxide particles having a thick layer of dispersant molecules formed on respective surfaces thereof. It is believed that this thick layer of dispersant molecules is responsible, at least in part, for the anti-agglomeration effect of the pigment particles that settle out of the liquid phase of the inkjet ink during nonuse thereof. The anti-agglomeration effect was found, e.g., utilizing pigment particles including $TiO_2$ particles including a thick layer of polyether-alkoxysilane dispersants, where each dispersant molecule included eight PEG hydrophilic segments. This was shown in Example 2 above. The anti-agglomeration effect was also found utilizing pigment particles having a coating formed by much smaller alkoxysilane dispersant molecules, such as carboxyethyl alkoxysilane dispersants, where each of these dispersant molecules has a short, single hydrophilic segment. This was shown in Example 3 above. It is thus believed that the anti-agglomeration affect may be achieved despite the differences in the chain length of the dispersant molecules as long as the dispersant molecules form the desirable thick coating on the respective surfaces of the metal oxide particle cores and do not deleteriously affect viscosity of the inkjet ink so that the ink can be jetted from an inkjet pen.

Further, by virtue of the fact that the alkoxysilane moiety can form multiple bonds (e.g., up to three bonds), at least one of these bonds may be used to attach the dispersant molecule with other alkoxysilane moieties, e.g., on other dispersant molecules. In this way, dispersants having smaller molecular chains can still form thick coatings on the metal oxide particle cores. This is in contrast to small molecules that do not have the alkoxysilane moiety (e.g., an inorganic phosphate), where the inorganic phosphate molecule can bond to the metal oxide particle core, but the inorganic phosphate molecules cannot bond to one another, and a thick coating cannot be formed. This is evidenced by the results of Example 1 above.

It is to be understood that the ranges provided herein include the stated range and any value or sub-range within the stated range. For example, a range from about 10 wt % to about 50 wt % should be interpreted to include not only the explicitly recited limits of about 10 wt % to about 50 wt %, but also to include individual values, such as 15 wt %, 25 wt %, 36 wt %, etc., and sub-ranges, such as from about 20 wt % to about 40 wt %, from about 30 wt % to about 50 wt %, etc. Furthermore, when "about" is utilized to describe a value, this is meant to encompass minor variations (up to +/−5%) from the stated value.

While several examples have been described in detail, it will be apparent to those skilled in the art that the disclosed examples may be modified. Therefore, the foregoing description is to be considered non-limiting.

What is claimed is:
1. An inkjet ink, comprising:
    an aqueous ink vehicle; and
    a pigment incorporated into the aqueous ink vehicle, the pigment including:
        any of metal oxide particles or mixed metal oxide particles, each particle having an outer surface; and
        a plurality of reacted dispersant molecules attached to the outer surface of each particle to form a coating thereon, the plurality of reacted dispersant molecules attached through a silanol linking group of the reacted dispersant molecules;

wherein the coating is present in an amount ranging from about 10 wt % to about 50 wt % with respect to a wt % of the any of the metal oxide particles or the mixed metal oxide particles;

and wherein each of the any of the metal oxide particles or the mixed metal oxide particles has a particle size ranging from 0.15 μm (150 nm) to about 3 μm (3000 nm).

2. The inkjet ink as defined in claim 1 wherein each of the any of the metal oxide particles or the mixed metal oxide particles has a particle size ranging from 0.15 μm (150 nm) to about 1 μm (1000 nm).

3. The inkjet ink as defined in claim 1 wherein the any of the metal oxide particles or the mixed metal oxide particles are chosen from metal oxides or mixed metal oxides having a refractive index ranging from about 1.6 to about 3.0.

4. The inkjet ink as defined in claim 1 wherein each of the plurality of reacted dispersant molecules includes a hydrophilic segment that enables the pigment to be dispersible in the aqueous ink vehicle.

5. The inkjet ink as defined in claim 1 wherein the plurality of reacted dispersant molecules is a reaction product of a plurality of reactive dispersant molecules chosen from reactive dispersants containing water-soluble polyether chains, phosphonates, and carboxylates.

6. The inkjet ink as defined in claim 1 wherein the metal oxides are chosen from oxides of zirconium, oxides of aluminum, oxides of hafnium, oxides of niobium, oxides of zinc, oxides of dysprosium, oxides of tantalum, and oxides of yttrium, or wherein the mixed metal oxides are chosen from $Bi_{12}SiO_{20}$, $PbTiO_3$, $SrTiO_3$, $ZrY_2O_5$, $AlPO_4$, and $BaTiO_3$.

7. The inkjet ink as defined in claim 1 wherein the pigment is present in an amount ranging from about 1 wt % to about 40 wt % of the inkjet ink.

8. The inkjet ink as defined in claim 1 wherein the presence of the plurality of reacted dispersant molecules prevents agglomeration of the pigment so that the pigment is re-dispersible in the aqueous ink vehicle upon sedimentation of the pigment over time of non-use of the inkjet ink.

9. A method of making a pigment, comprising:

adding any of metal oxide particles or mixed metal oxide particles and reactive dispersant molecules to an aqueous medium, each of the any of the metal oxide particles or the mixed metal oxide particles including a hydroxyl group, and each of the reactive dispersant molecules including a hydrolysable alkoxysilane moiety;

during dissolution of the reactive dispersant molecules in the aqueous medium, hydrolyzing the hydrolysable alkoxysilane moiety of each of the reactive dispersant molecules inside the aqueous medium, the hydrolyzing forming reacted dispersant molecules, each of which includes a silanol group; and reacting the silanol group of some of the reacted dispersant molecules with the hydroxyl group of the any of the metal oxide particles or the mixed metal oxide particles to bond the some of the reacted dispersant molecules to the any of the metal oxide particles or the mixed metal oxide particles;

wherein each of the any of the metal oxide particles or the mixed metal oxide particles has a particle size ranging from 0.15 μm (150 nm) to about 3 μm (3000 nm).

10. The method as defined in claim 9, further comprising reacting the silanol group of non-bonded reacted dispersant molecules with a hydroxyl group of the some of the reacted dispersant molecules bonded to the any of the metal oxide particles or the mixed metal oxide particles to bond the non-bonded reacted dispersant molecules to the some of the reacted dispersant molecules.

11. The method as defined in claim 9 wherein the hydrolysable alkoxysilane moiety of the reactive dispersant molecules has the formula —$Si(OR)_3$, wherein R is $CH_3$ or $C_2H_5$.

12. The method as defined in claim 9 wherein the reactive dispersant molecules are chosen from:

i)

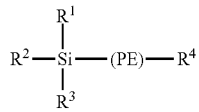

Structure I wherein $R^1$, $R^2$, and $R^3$ are hydroxyl groups, linear alkoxy groups, or branched alkoxy groups, $R^4$ is hydrogen, a linear alkyl group, or a branched alkyl group, and PE is a polyether oligomer chain segment of the structural formula $[(CH_2)_n—CH(R)—O]_m$, where n is an integer ranging from 0 to 3, m is an integer greater than or equal to 2, and R is H or a chain alkyl group;

ii)

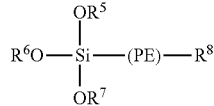

Structure II wherein $R^5$, $R^6$, and $R^7$ are hydrogen, linear alkyl groups or branched alkyl groups, $R^8$ is hydrogen, a linear alkyl group, or a branched alkyl group, and PE is a polyether oligomer chain segment of the structural formula $[(CH_2)_n—CH(R)—O]_m$, where n is an integer ranging from 0 to 3, m is an integer greater than or equal to 2, and R is H or a chain alkyl group; and iii)

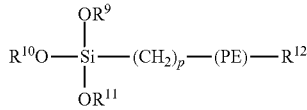

Structure III wherein $R^9$, $R^{10}$, and $R^{11}$ are hydrogen, linear alkyl groups or branched alkyl groups, $(CH_2)_p$ is a linking group, where p is an integer ranging from 3 to 8, $R^{12}$ is hydrogen, a linear alkyl group, or a branched alkyl group, and PE is a polyether oligomer chain segment of the structural formula $[(CH_2)_n—CH(R)—O]_m$, where n is an integer ranging from 0 to 3, m is an integer greater than or equal to 2, and R is H or a chain alkyl group.

13. A method of making an inkjet ink, comprising:
preparing a pigment by the method of claim 9; and
incorporating the pigment into an aqueous ink vehicle.

14. The method as defined in claim 13 wherein the aqueous ink vehicle includes one of i) water or ii) water and at least one solvent.

15. The method as defined in claim 13 wherein the aqueous ink vehicle further includes at least one additive chosen from surfactants, binders, and biocides.

* * * * *